July 31, 1956  J. HIRSCHMAN  2,756,792
TOOL WITH SPEEDING GEAR
Filed July 26, 1954
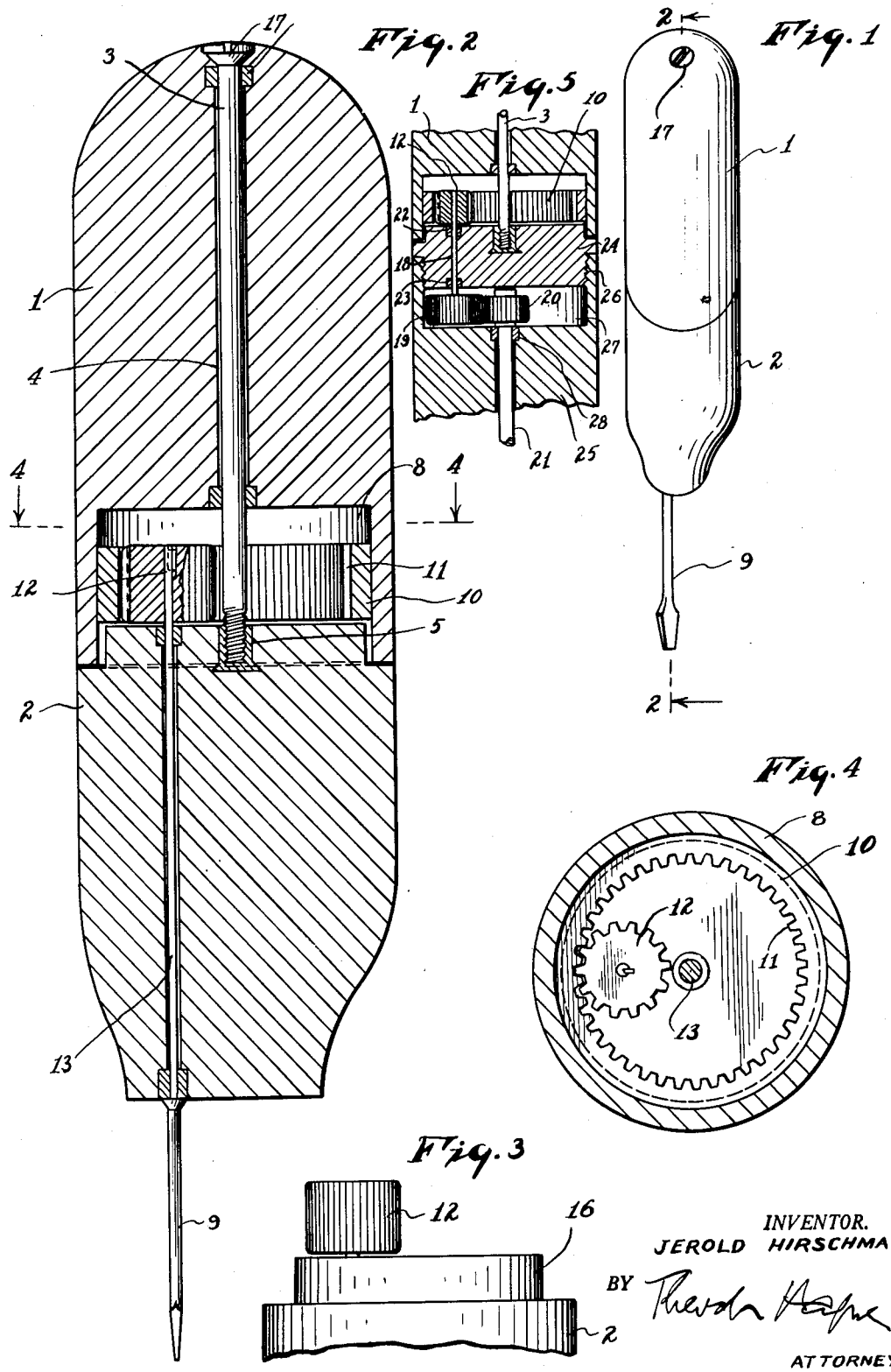
INVENTOR.
JEROLD HIRSCHMAN
BY
ATTORNEY

United States Patent Office 2,756,792
Patented July 31, 1956

2,756,792

TOOL WITH SPEEDING GEAR

Jerold Hirschman, Charleston, S. C.

Application July 26, 1954, Serial No. 445,751

3 Claims. (Cl. 145—66)

This invention relates to a screwdriver or similar manually operable rotating tool of elongated shape, more specifically a screwdriver of high power and easy maneuverability.

One of the objects of the invention is a screwdriver in which the handle is divided longitudinally into two portions or sections, movable against each other; one section which is rotated by the operator and used to drive the screwdriving element or like tool over a transmission gear, and the other section which is held fixedly by the operator and adapted to be supporting such screwdriving element or like tool.

Another object of the invention is to incorporate in the screwdriver a transmission gear permitting the relative large movement and relative small force of the operator's hand be translated into a smaller movement involving a relatively great amount of force.

Still another object of the invention, is a screwdriver having a hollow handle enclosing a transmission gear which couples the screwdriving element to a rotatable section of the handle so as to permit the manual force applied to the rotatable portion to be translated into a larger force exerted by the tip of the screwdriver.

Still another object of the invention, is to incorporate in a tool handle a transmission gear, the driving part of which is coupled to a movable part of that handle and the driven part of which is coupled to a screwdriving element so as to permit transformation of force applied to the handle into a larger force exerted by the screwdriving element.

These and other objects of the invention will be more fully understood from the drawings annexed herewith, in which, Fig 1 represents an assembly view of an embodiment of the invention;

Fig. 2 represents in an enlarged scale a longitudinal cross-section therethrough;

Fig. 3 represents a view of the lower section of a screwdriver, and

Fig. 4 a cross-section through the screwdriver along lines 4—4.

Fig. 5 shows a modification of the invention as represented in Fig. 2.

In Figs. 1, 2, 3 and 4, the handle of a screwdriver of otherwise normal and generally cylindrical shape is shown to be longitudinally subdivided into two substantially cylindrical sections 1, 2.

The upper section 1 of the handle fits over and is attached to the lower handle section 2 by means of a screw bolt 3 passing through opening 4 of upper handle section 1 and threaded into a bushing 5 of lower handle section 2.

Screw 3 is mounted in bearings made of brass, bronze or the like schematically indicated in Fig. 2 at 6 and 7 respectively, which permit the operator manually to rotate upper section with respect to bolt 4 and lower section 2.

Friction bearings 6 and 7 can be replaced if desired by ball bearings to facilitate still further the relative movement between upper handle section 1 and lower handle section 2.

Upper handle section 1 is also provided with an internal cylindrical cavity schematically indicated in Fig. 2 at 8, and which serves to receive a reduction gear permitting the manual rotation by one hand of the operator of upper section 1 to be transmitted to a screwdriving element 9 rotatably supported in lower section 2, which is fixedly held by the operator with his other hand.

This rotation of screwdriving element 9 is achieved in the following manner:

There is attached to driving section 1 and inside cavity 8 a gear wheel 10 having inner teeth 11 meshing with another smaller gear wheel 12 fixedly coupled to or keyed on shaft 13 of screwdriving element 9.

Shaft 13 of screwdriving element 9 extends through a central longitudinal opening 14 of lower section 2 and is mounted rotatable with respect to section 2 in bearings 14, 15 which are similar to those indicated in upper section 1 at 3 and 4 respectively, and which can also be replaced by any other type of bearing, for example, ball bearings, without exceeding the scope of the invention.

Rotation over a predetermined circumferential distance of upper section 1 with respect to lower section 2 and bolt 4 attached thereto, causes rotation of outer gear 10 and subsequent rotation over a smaller circumferential distance of smaller gear 12, shaft 13 and screwdriving element 9.

In this way, the manual force exerted by the hand upon handle section 1 and gear 10 is transmitted over gear 12 and shaft 13 to the screwdriving element at an increased degree depending upon the transmission rate of gears 10, 12.

In this way, it will be possible with a relatively small amount of effort to produce a relatively great amount of rotary force on screwdriving element 9.

Lower handle section 2 is shown in Fig. 3 with gear 12 extending therefrom and supported on a recessed projection 16 of lower handle section 2. Accordingly, cavity 8 of upper section 1 has a wall of sufficient thickness to extend over projection 16 of section 2 thereby permitting gear mechanism 10, 12 to be completely enclosed in handle 1, 2.

Gear mechanism 10, 12 can be replaced by any other type of transmission be it of the tooth wheel type or the friction wheel type. Instead of a wheel mechanism, any other power or lever transmission otherwise well known in the art can be provided without departing from the scope of the invention.

Fig. 1 shows an assembled screwdriver in accordance with invention with the screwdriving element 9 projecting therefrom and the head 17 of bolt 5 apparent on the top of upper section 1.

In order to disassemble such a screwdriver it is only necessary to unscrew bolt 5 on head 17 and all parts become accessible for maintenance or replacement.

In the embodiment of Figs. 1 to 4 the screwdriving element or driver tool 9 is arranged eccentrically with respect to handle sections 1, 2.

In the modification of Fig. 5, the screwdriving element 11 is shown to be supported concentrically with respect to handle 1, 2. At the same time a further gear reduction and a larger increase of the manual force applied to handle section 1 is achieved by coupling gear 12 coupled to inner gear 10, additionally over a shaft 18 to a third gear 19 meshing with a fourth gear 20 arranged concentric with the axis of handle 1, 2 and driving over shaft 21 a screwdriving element of any desired shape or construction.

In Fig. 5 gears 12 and 19, and shaft 18 are rotatably supported on bearings 22, 23 provided in cylindrical insert 24 connecting upper handle section 1 and lower handle section 25.

Cylindrical insert 24 on its top portion is similarly recessed as lower handle section 2 of Figs. 1 to 4, while at its bottom portion, insert 24 is provided with an outer thread fitting into a corresponding inner thread of lower handle section 25 which in the modification of Fig. 5 is provided with a cavity 27 receiving gears 19 and 20 and which also supports along its axis driving shaft 21 by means of a bearing 28.

Thus rotation of upper handle section 1 about bolt 3 will cause rotating of shaft 21 about an axis substantially coaxial with the axis of rotation of upper handle section 1.

The invention is not limited to the shape of the screwdriver shown nor to screwdrivers only.

It can be applied with equal or similar effect to other manually operated tools where rotation is required in its operation, for example, to hand drills, taps, grinders, and the like rotating hand tools without exceeding the scope of this disclosure.

It is equally possible to provide other or different gears or any other transmission elements to operate in similar or different arrangements all within the framework of this invention.

I claim:

1. A screwdriver comprising a screwdriving member, a handle comprising two sections forming a cavity and movable with respect to each other, one being adapted to be manually rotated, and the other being adapted to be held fixedly; said screwdriving member being rotatably supported in said fixed section, and a gear mechanism arranged in said cavity and coupling said rotating section to said screwdriving member so as to permit movement of said screwdriving member under control of said rotating section said gear mechanism including a first larger gear attached to said rotating section and having an inner teeth arrangement, a second smaller gear arranged inside said larger gear and engaging said inner teeth, a third gear coaxially coupled to said second gear and a fourth gear meshing with said third gear and arranged coaxially with said first gear, said fourth gear being attached to said screwdriving member so as to cause said screwdriving member to extend from the fixed section substantially along the axis of rotation of said rotating section.

2. Screwdriver according to claim 1 wherein said handle is of substantially cylindrical shape and includes a center section, said rotatable section being at the end of the handle opposite the end from which the screwdriving member extends, said rotatable section being removable from the rest of the handle, and said center section of the handle being removably attached to the fixed section of the handle, said center section having a shaft extending therethrough for supporting said second gear at one side of said center section and said third gear at an opposite side of said center section.

3. Screwdriver according to claim 2 wherein said center and fixed sections are rigidly attached to each other, one being screwed over the other.

References Cited in the file of this patent

UNITED STATES PATENTS

| | | |
|---|---|---|
| 348,765 | Neal | Sept. 7, 1886 |
| 848,025 | Golden | Mar. 26, 1907 |
| 1,493,160 | Pierce | May 6, 1924 |
| 2,026,006 | Wennerstrom | Dec. 31, 1935 |
| 2,092,598 | Blair | Sept. 7, 1937 |

FOREIGN PATENTS

| | | |
|---|---|---|
| 36,677 | Sweden | July 2, 1912 |
| 298,117 | Italy | June 28, 1932 |
| 261,170 | Switzerland | Aug. 1, 1949 |
| 813,379 | Germany | Sept. 17, 1951 |